United States Patent
Lawrence et al.

(10) Patent No.: US 6,784,830 B1
(45) Date of Patent: Aug. 31, 2004

(54) METHOD FOR PROCESSING IN DUAL FREQUENCY CIVILIAN GPS RECEIVER

(75) Inventors: David G. Lawrence, Mountain View, CA (US); H. Stewart Cobb, Palo Alto, CA (US); Paul Y. Montgomery, Menlo Park, CA (US)

(73) Assignee: IntegriNautics Corporation, Menlo Park, CA (US)

( * ) Notice: Subject to any disclaimer, the term of this patent is extended or adjusted under 35 U.S.C. 154(b) by 0 days.

(21) Appl. No.: 10/413,354

(22) Filed: Apr. 14, 2003

Related U.S. Application Data

(60) Provisional application No. 60/383,064, filed on May 22, 2002, and provisional application No. 60/373,688, filed on Apr. 16, 2002.

(51) Int. Cl.[7] ................................................ G01S 5/14
(52) U.S. Cl. ............................................... 342/357.12
(58) Field of Search ........................ 342/357.12, 357.06

(56) References Cited

U.S. PATENT DOCUMENTS 5,708,439 A * 1/1998 Lennen .................. 342/357.12
6,125,135 A * 9/2000 Woo et al. .................... 375/130
6,157,341 A * 12/2000 Silvestrin et al. ...... 342/357.12

FOREIGN PATENT DOCUMENTS

WO     WO 96/27139 A1 * 9/1996 ............. G01S/1/04

* cited by examiner

Primary Examiner—Gregory C. Issing
(74) Attorney, Agent, or Firm—Brinks Hofer Gilson & Lione

(57) ABSTRACT

A method and a system for L1/L2 phase and magnitude determination in satellite navigation equipment is disclosed herein. The method generates separate W code estimates for the L1 signal and the L2 signal, the estimates being uncorrelated with the error in the inphase and the quadrature components of the corresponding signals. The W code is estimated using both the L1 signal as well as the L2 signal. The L1 and L2 baseband signals are obtained from the corresponding RF signals. The baseband signals are added and then filtered using a non-causal FIR LPF. This filter has the property that the output at a time instant is uncorrelated with the input at that time instant. In the preferred embodiment, a one-W-code-bit I&D filter is used instead of a FIR LPF. In an alternate embodiment, a single W code estimate is obtained for both the L1 and the L2 signal.

22 Claims, 5 Drawing Sheets

US 6,784,830 B1

METHOD FOR PROCESSING IN DUAL FREQUENCY CIVILIAN GPS RECEIVER

This application claims benefit of Ser. No. 60/373,688 filed Apr. 16, 2002, which claims benefit of Ser. No. 60/383,064 filed May 22, 2002.

BACKGROUND

The present invention relates to Global Positioning System (GPS) receivers, and deals more particularly with a method and a system for improving the performance of a dual frequency civilian GPS receiver.

The Global Positioning System (GPS) is a satellite based navigation system having a constellation of 24 Earth orbiting satellites. These satellites are approximately uniformly dispersed around six circular orbits having four satellites each. Theoretically, four or more GPS satellites are visible from most points on the Earth's surface.

Each GPS satellite presently transmits at two frequencies: L1 (1575.42 MHz) and L2 (1227.60 MHz). There exists provision (for the future) for a third frequency L5 (1176.45 MHz) as well. The L1 frequency has two different spread-spectrum codes modulated on it: a coarse acquisition (C/A) code and a Y code. The C/A code is an unclassified code intended for civilian navigation. It has a chipping rate of 1.023 MHz and a sequence length of 1023 chips. The Y code is a classified unknown code; people doing research in this area have found it to be the product of two codes: a precise (P) code and a W code. The P code is an unclassified code with a chipping rate of 10.23 MHz. The P code is long enough that it does not repeat during a week; it is reset at the beginning of the GPS week for each satellite. The P code is mixed with the classified W code to get an encrypted Y code. The W code has been empirically found to have a chipping rate of approximately 500 KHz. The Y code is modulated onto the L1 carrier in quadrature with the C/A code and with half the power of the C/A code. The Y code is also modulated onto the L2 carrier signal with half the power of L1 Y code. Both C/A and P codes are unique for each satellite.

GPS receivers are commonly used for a variety of applications involving tracking of the position of various objects. The object to be tracked is coupled to one or more GPS antennae that receive signals from the GPS satellites. Depending upon the level of accuracy and the response time desired by a user, an appropriate method of obtaining position of an object using GPS may be adopted.

Dual frequency receivers that utilize both L1 and L2 frequency signals can determine the position much faster than a single frequency receiver can. A technique that uses both L1 and L2 carrier phase measurements is faster than the one using just L1 carrier phase measurements.

The L1 carrier can be recovered by using any standard correlation technique as the C/A code is known for each of the satellites. The L2 carrier signal is encrypted, thus only military GPS receivers that are aware of the W code can accurately reconstruct the L2 carrier signal. Civilian receivers can also reconstruct the L2 carrier signal using any of the known standard techniques, most of which derive the L2 carrier using the L1 carrier. However, the signal to noise ratio (SNR) of the resulting L2 signal is lower than that of the L2 signals reconstructed using military receivers.

A better way of estimating the phase of the L2 carrier signal is to remove an estimated W code from the L2 signal before phase determination. However, this requires estimation of the unknown W code for the civilian GPS receivers.

Various ways of estimating the phase of the L2 carrier signal using the W code have been proposed in the prior art.

U.S. Pat. No. 5,576,715 titled "Method and Apparatus for Digital Processing in a Global Positioning System Receiver", granted to Leica Inc., Buffalo, N.Y., describes one way of determining the phase of the carrier signal using the W code. The estimated W code is used to track the P code in this patent. The L1 and L2 signals are correlated with locally generated P codes to obtain baseband signals. The baseband signals are separately integrated. The quadrature errors thus produced are integrated over a period of time (approximately the chip period of the W code), which is then used as a control input to adjust the locally generated L2 carrier phase.

Another method of determining the phase of carrier signal is described in U.S. Pat. No. 5,293,170 titled "Global Positioning System Receiver Digital Processing Technique", granted to Ashtech Inc., Sunnyvale, Calif. An estimate of W code obtained from the L1 signal is removed from the L2 signal and the estimate of W code obtained from the L2 signal is removed from the L1 signal. The signal thus obtained allows local oscillators and locally generated estimates of P code to be phase locked with L1 and L2 signals.

Yet another method for determining phase of the carrier signal is described in U.S. Pat. No. 6,125,135 Titled "System And Method For Demodulating Global Positioning System Signals", granted to Navcom Technology, Inc., Redondo Beach, Calif. This patent describes a method of adjusting the locally generated estimate of P code signal in accordance with the estimated W code to obtain better signal strengths. The estimated W code is thereafter multiplied with the quadrature component of the L2signal to obtain an error signal that provides an estimate of the L2 carrier phase.

Another dual frequency GPS receiver is described in U.S. Pat. No 5,736,961 titled "Dual Frequency Global Positioning System", granted to NovAtel Inc., Calgary, Canada. This patent describes a method of cross correlation in which the L1 signal is correlated using the C/A code phase and the L2 P code phase is determined using the L1 P code phase. A standard feedback loop is used to refine the phase of the L2 carrier signal.

Yet another method as described in U.S. Pat. No. 5,541,606 titled "W-Code Enhanced Cross Correlation Satellite Positioning System Receiver", granted to Trimble Navigation Limited, Sunnyvale, Calif., discloses a W code enhanced cross-correlation technique. Separate estimates of the Y code are generated for the L1 and the L2 signals. The method generates separate W code estimates for both the RF signals by removing the respective P codes from these Y code estimates.

All the abovementioned methods have one or more of the following disadvantages. Some of the methods allow the estimated W code signal to be removed only from the quadrature components of the L1 signal or the L2 signal. All the above methods require generation of a near exact replica of the Y code carrier signal. This requirement results in a need to continuously track the errors and drive them to zero.

Hence, there is a need for a method and a system for estimating the W code that allows its removal from the inphase as well as the quadrature components of the L1 and/or the L2 signals.

SUMMARY

An object of the present invention is to provide a W code estimate derived from the L1 signal and the L2 signal. This W code estimate can be removed from the quadrature as well as the inphase components of the L1/L2 signals.

Another object of the present invention is to provide different W code estimates for the L1 signal and the L2 signal. Both the W code estimates are generated using the L1 signal and L2 the signal.

Yet another object of the present invention is to provide an estimate of the W code derived from both the L1 signal and the L2 signal that is uncorrelated with the inphase and the quadrature errors of the L1 and the L2 baseband signals.

Another object of the present invention is to provide the phases and the relative magnitudes of the L1 Y code carrier and the L2 Y code carrier.

To achieve the foregoing objects and in accordance with the purpose of the present invention as broadly described herein, the present invention provides a method and a system for determination of the phase of the L2 Y code carrier. This is achieved by estimating separate W codes for the L1 and L2 signals. The W code estimate for the L1 signal is uncorrelated with the errors in the inphase and quadrature components of the L1 signal. Similarly, the W code estimate for the L2 signal is uncorrelated with the errors in the inphase and quadrature components of the L2 signal.

The RF signals received by the antenna from the GPS satellite are down converted, filtered and sampled to generate first complex signals. The first complex signal comprises two components: an inphase component and a quadrature component. An estimate of P code and an estimate of the carrier are removed from the first complex signals to obtain baseband signals. In the preferred embodiment, the baseband signals thus obtained are accumulated using separate accumulators. The accumulated signals are then weighted and passed through a non-causal FIR LPF. In the preferred embodiment, a one-W-code-bit Integrate and dump (I&D) filter is used. The initial estimates of W code are obtained by subtracting the corresponding weighted signals from the output of the I&D filter. Separate W code estimators act on the initial estimates to generate uncorrelated W code estimates. The L1 W code estimate is uncorrelated with the error in the inphase and the quadrature components of the L1 signal. Similarly, the L2 W code estimate is uncorrelated with the error in the inphase and the quadrature components of the L2 signal. The signals obtained after removing the corresponding estimates of the W code from the baseband signals are then filtered to generate a measure of the magnitude and the phase of the L1 and the L2 signals. In an alternate embodiment, a triangle filter is used instead of an I&D filter. In another alternate embodiment, a single W code estimate is generated for both the L1 and the L2 signals.

The present invention provides W code estimates that are uncorrelated with the errors in the inphase and the quadrature components of the L1 signal and the L2 signal. This allows for removal of the W code from the inphase component of both the L1 signal and the L2 signal with zero mean errors. The present invention also provides estimates of relative magnitudes of the L1 signal and the L2 signal, which may be used to estimate the statistics of the phase errors due to noise. The strength of the signals may be maximized later to align the code phase replicas with the incoming signals. The multipath environment may also be studied by looking for alternating periods of constructive/ destructive interference. The present invention also obviates the need to generate an exact replica of the Y code carrier before removing it from the L1 and the L2 signals. The present invention also has many implementation advantages because of the simplicity of design.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DESCRIPTION OF PREFERRED EMBODIMENTS

The present invention provides a method for calculating the phase and the magnitude of the L1 and the L2 Y code carrier signals in satellite navigation equipment and a system for implementing the method. The phase and the magnitude is determined by estimating separate W codes for L1 and L2 signals. The W code is derived from both the L1 signal and the L2 signal. The present invention also provides a GPS receiver using the abovementioned method.

Figure 1:
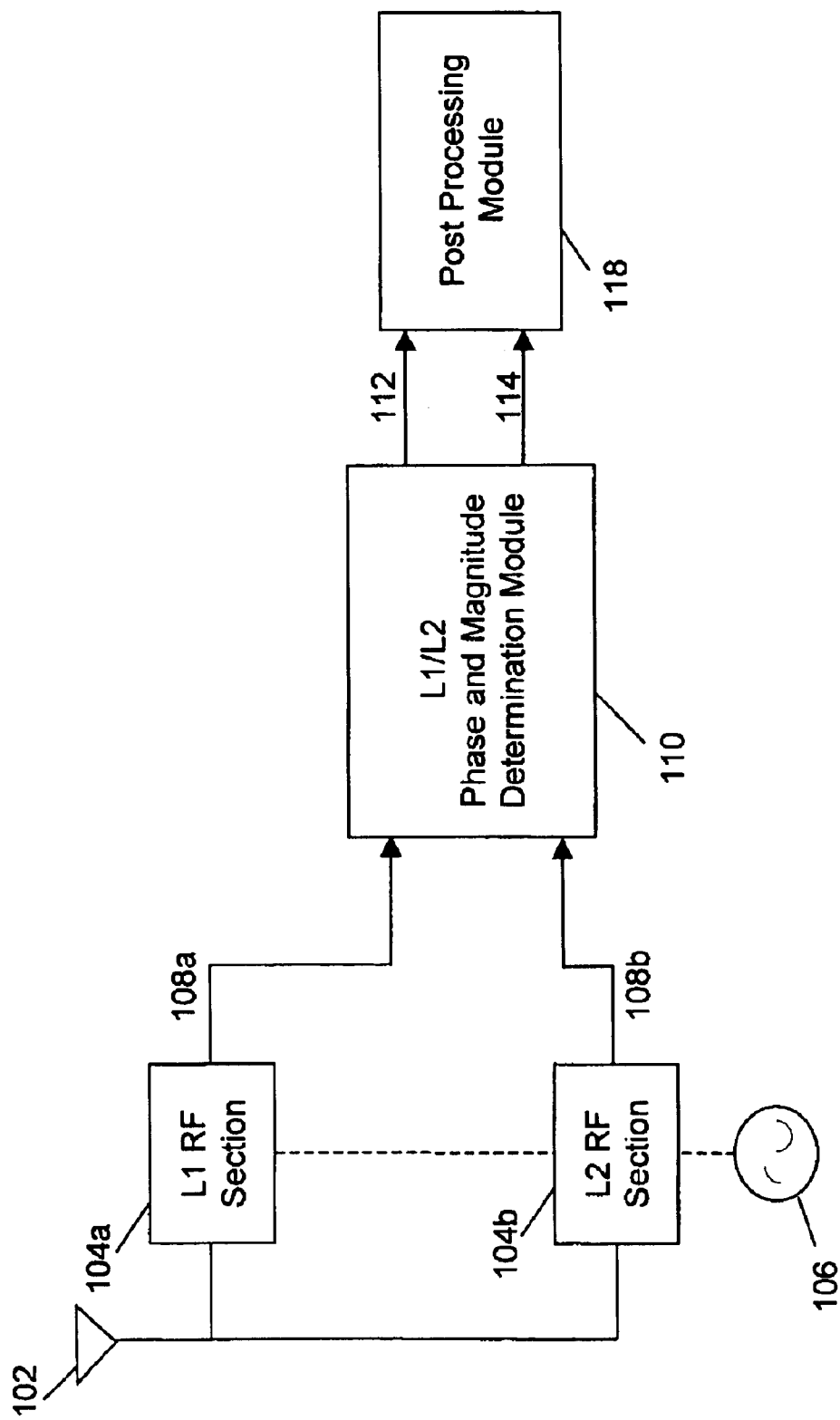
FIG. 1 is an exemplary block diagram illustrating the complete GPS receiver using the processing method for L1/L2 carrier phase and magnitude determination in accordance with the present invention.

Referring now primarily to FIG. 1, an exemplary block diagram of a GPS receiver using the L1/L2 phase determination method is hereinafter described. An antenna 102, which is an L1/L2 antenna, receives L1 and L2 signals from the GPS satellites.

The L1 signal, modulated with the C/A code and the Y code, can be represented as:

$$L1(t) = A \times C/A(t) \times \cos(2 \times \pi \times L1 \times t) + A/\sqrt{2} \times Y(t) \times \sin(2 \times \pi \times L1 \times t) \quad (1)$$

where,

A is the amplitude of the L1(t) signal;

C/A(t) is the C/A code as a function of time with value being either +1 or −1;

Y(t) is the Y code as a function of time with value being either +1 or −1;

$$Y(t) = W(t) \times P(t); \quad (1a)$$

W(t) is the W code as a function of time with value being either +1 or −1;

P(t) is the P code as a function of time with value being either +1 or −1;

L1 is the frequency of the L1 signal which is 1575.42 MHz; and t is the time variable.

W(t) in the above equation refers to the W code along with the 50 Hz modulated data signal that is present in all the RF signals providing various information regarding satellite ephemeris, almanac, health, etc. Hence $$W(t) = W_o(t) \times D(t) \quad (1b)$$

where, $W_o(t)$ is the original W code; and $D(t)$ is the 50 Hz data signal.

As the W code is a 500 KHz signal while $D(t)$ is a 50 Hz signal, even after removing $D(t)$, a 500 KHz unknown signal still remains. Nothing substantial is gained by estimating these two codes separately. Hence, $W(t)$ is directly estimated.

Similarly, the L2 signal can be represented as:

$$L2(t)=A/2 \times Y(t) \times \sin(2 \times \pi \times L2 \times t + \phi) \qquad (2)$$

where,

L2 is the frequency of the L2 signal which is 1227.60 MHz; and $\phi$ is the phase difference between the L1 and L2 signals.

Although the power of the L2 signal is ideally half the power of the L1 signal, it may divererge from the ideal value because of variable antenna gains, multipath, variable satellite location and various other factors.

Antenna 102 is connected to an L1 RF section 104a and an L2 RF section 104b. L1 RF section 104a processes the L1 RF signal while L2 RF section 104b processes the L2 RF signal. Each RF section filters, down converts and samples the input RF signal. The RF section down converts the input RF signal to one or more convenient intermediate frequencies (IF). The RF section samples each of the down converted RF signals into two components: inphase and quadrature. For every sample time, the IF signal is sampled twice, the two samples being 90° out of phase with each. Both the RF sections are connected to a common clock 106.

The combination of the inphase component and the quadrature component of a signal is hereinafter represented as a complex signal. L1 RF section 104a outputs an L1 first complex signal 108a while L2 RF section 104b outputs an L2 first complex signal 108b.

All the signals are henceforth represented using the phasor notation.

The first complex signal may be represented in phasor notation as:

$$\text{First complex signal} = A_o \times Y(t) \times \exp(j \times (w_{if} \times t + \phi)) \qquad (3)$$

where, $A_o$ is $A/\sqrt{2}$ for the L1 signal and $A/2$ for the L2 signal;

$\phi$ is equal to $\phi_1$ for the L1 signal and $\phi_2$ for the L2 signal;

$w_{if}$ is the intermediate frequency; and j is the imaginary number $\sqrt{-1}$.

Both the first complex signals change their angle by 180° each time the chip of the Y code changes.

L1 first complex signal 104a and L2 first complex signal 104b are input to an L1/L2 phase and magnitude determination module 110. The outputs of the module are: an estimate of the phase and the relative magnitude of L1 Y code carrier 112 and an estimate of the phase and the relative magnitude of L2 Y code carrier 114. A post processing module 118 connected to L1/L2 phase and magnitude determination module 110 calculates the position and other desired parameters from this information using any of the standard techniques available in the art. Some of these techniques are disclosed in a research paper by K. T. Woo titled "Optimum semi-codeless carrier phase tracking of L2", presented at the International Technical Meeting of the Satellite Division of the Institute of Navigation, Nashville, Tenn., Sep. 14–17, 1999.

L1/L2 phase and magnitude determination module 110 removes the P code and the Y code carrier from the L1 signal and the L2 signal. The signals thus obtained are termed as baseband signals. The module also generates an estimate of the W code. This estimate of the W code is removed from the inphase as well as the quadrature components of the baseband signals to obtain signals which, after accumulation, yield signals that are a measure of the phase of the Y code carrier.

In conventional systems, if the W code estimate is removed from both the inphase as well as the quadrature components of the L1 signal and the L2 signal, the error in the inphase component of the L1 and L2 signals contains one non-zero mean term. This is because one of the resulting terms is the square of a measurement error and therefore is not zero mean. Hence, it cannot be accumulated to provide a meaningful Y code carrier phase angle.

The present invention discloses various methods of generating an estimate of W code that may be removed from both the inphase as well as the quadrature components of the L1 signal and the L2 signal. This is achieved by removing the correlation between the estimate of the W code and the errors of the baseband samples from which the estimate is removed. The W code estimate derived from both the L1 signal and the L2 signal and the W code estimate is uncorrelated with the error in the inphase and the quadrature components of the baseband signals.

In one approach, two separate W code estimates are derived using both the L1 signal and the L2 signal. The first W code estimate is uncorrelated with the error in the inphase and the quadrature components of the L1 signal. The second W code estimate is uncorrelated with the error in the inphase and the quadrature components of the L2 signal. In another approach, a single W code estimate that is uncorrelated with the error in the inphase and the quadrature components of the L1 as well as the L2 signal is generated.

The W code estimate thus obtained may be removed from the inphase as well as the quadrature components of the L1 signal and the L2 signal. Hereinafter, various ways of determining the L1/L2 phase and magnitude in accordance with the present invention are disclosed.

Exemplary Block Diagrams for the L1/L2 Phase and Magnitude Determination Module

Various multipliers that are used in various embodiments of the present invention are defined here:

A complex multiplier is a multiplier that multiplies two complex inputs and outputs a complex quantity. A dot multiplier is a multiplier that performs dot product of two complex inputs to give a scalar output. A scalar multiplier multiplies a scalar with a complex or a scalar input. The output is a scalar quantity if both the inputs are scalar and it is complex quantity if the other input is complex.

Figure 2:
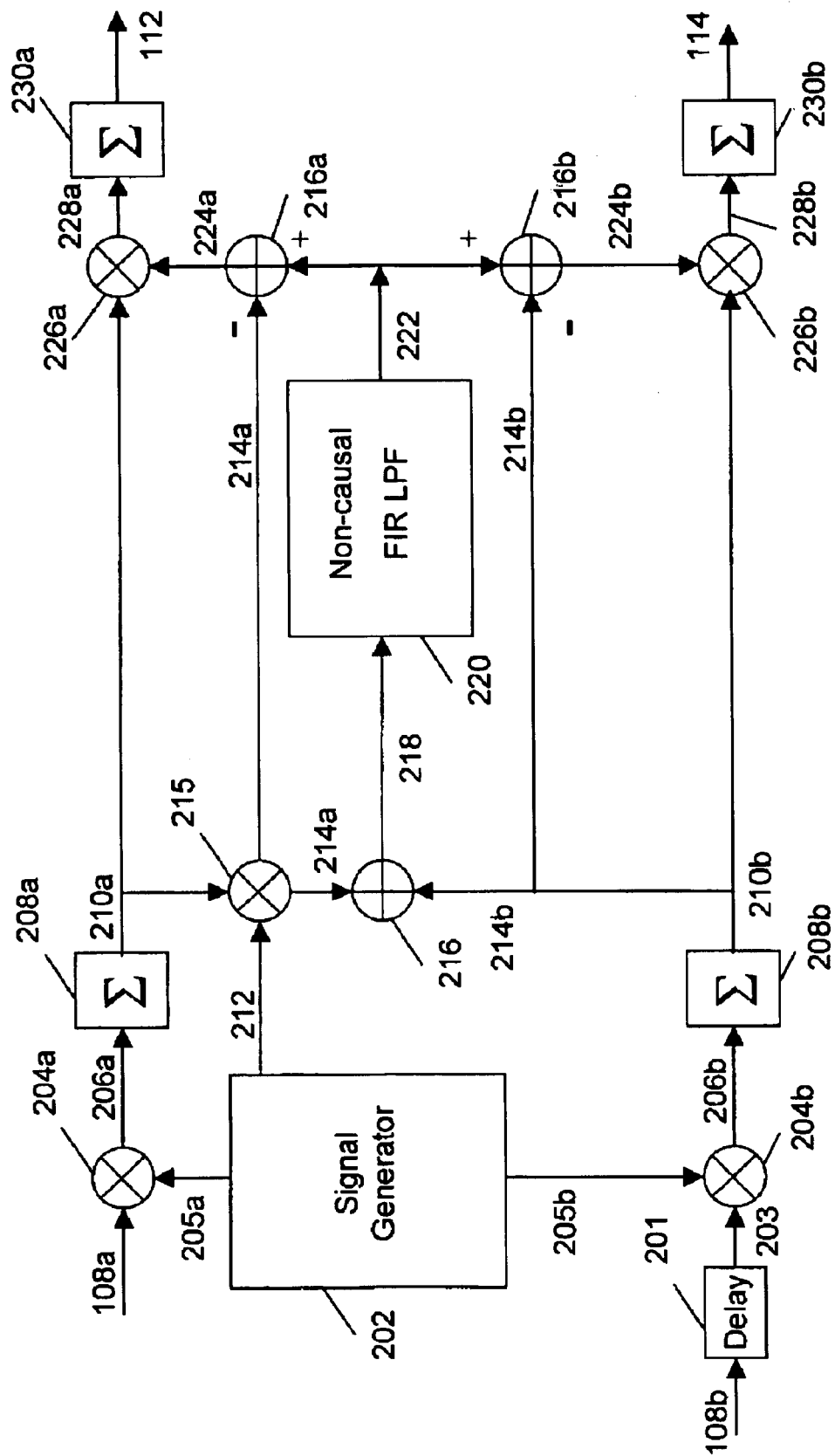
FIG. 2 is an exemplary block diagram illustrating the determination of L1/L2 carrier phases and magnitudes using a non-causal FIR LPF.

Referring now primarily to FIG. 2, the L1/L2 phase and magnitude determination module is hereinafter described in accordance with the preferred embodiment of the present invention.

Inputs to the L1/L2 phase and magnitude determination module are L1 first complex signal 108a and L2 first complex signal 108b. L2 first complex signal 108b is delayed by some time using a delay unit 201 to generate an L2 delayed complex signal 203. The L2 complex signal is delayed in order to account for the variable delays in transmission because of the ionosphere. Any of the methods known in the art may be used to achieve this. The step of delaying L2 first complex signal 108b is optional and may be omitted. The ionospheric delays may be accounted for while removing the P code in further processing.

An estimate of L1 P code is removed from L1 first complex signal 108a to obtain an L1 second complex signal. The estimate of P code is generated by a P code generator. The P code generator is implemented in a signal generator 202. Signal generator 202 also includes various other signal generation modules. The generation of the estimate of P code involves generation of the sequence for the P code and the determination of the appropriate phase of the signal.

L1 first complex signal 108a may be multiplied by a real value P(t), which is an estimate of the P code, to remove the L1 P code. As the amplitude of the P code is one, multiplying the L1 first complex signal by the estimate of the P code removes the P code to generate the L1 second complex signal. The L1 second complex signal may be represented as:

$$L1 \text{ second complex signal} = A_o \times W(t) \times \exp(j \times (w_{if} \times t + \Phi_1)) \quad (4)$$

The initial estimate of the L1 P code can be generated using the known relationship between the phases of the C/A code for the L1 signal and the P code for the L1 signal. If the detected signal strength for the L1 signal is less than the predefined strength, a search for the P code for the L1 signal may be performed.

In the next step, an estimate of the L1 Y code carrier is removed from the L1 second complex signal to obtain an L1 baseband signal 206a. L1 Y code carrier refers to the carrier signal, which has the L1 Y code modulated on it.

One of the ways of removing the L1 Y code carrier from the L1 signal is by multiplying the L1 second complex signal with an inverse of an estimate of the L1 Y code carrier. A scalar multiplier is used to obtain the L1 baseband signal. The inverse of the estimate of the L1 Y code carrier is the complex conjugate of the estimate of the L1 Y code carrier.

The generation of the estimate of the L1 Y code carrier signal may be achieved by using the known relationship between the phase of L1 C/A code and the phase of the L1 Y code.

Hereinafter, methods for generation of the estimate of L1 Y code carrier, as embodied in a Y code carrier generator are described. The Y code carrier generator is implemented in signal generator 202. The phase of L1 Y code carrier is determined using the known relationship between the phase of C/A code for the L1 signal and the L1 Y code carrier.

The generated estimate of the L1 Y code carrier signal can be represented as:

$$\text{Estimate of } L1 \ Y \text{ code carrier} = \exp(j \times (w_{if} \times t + \Phi_1)) \quad (5)$$

where, $\Phi_1$ is an estimate of the L1 Y code carrier.

The L1 baseband signal may be represented as:

$$L1 \text{ baseband signal} = \exp(-j \times (w_{if} \times t + \Phi_1)) \times A_o \times W(t) \times \exp(j \times (w_{if} \times t + \phi_1)) = A_o \times W(t) \times \exp(j \times (\phi_1 - \Phi_1)) \quad (5a)$$

Equation 5a represents an ideal L1 baseband signal. However, because of variable antenna gains and certain other factors, the actual baseband signals have an additional component of noise. This is represented as:

$$L1 \text{ baseband signal} = A_o \times W(t) \times \exp(j \times (\phi_1 - \Phi_1)) + N1 + N2 \times j \quad (5b)$$

where,

N1 is the inphase component of noise; and

N2 is the quadrature component of noise.

L2 delayed complex signal 203 is processed in a manner similar to the processing of L1 first complex signal 108a. The corresponding intermediate signals may be represented in similar ways. However, the methods of generation of the estimate of the L2 P code and the estimate of the L2 Y code carrier signal are different and are discussed hereinafter.

Similar to the L1 signal, an estimate of P code is removed from L2 delayed complex signal 203 to generate an L2 second complex signal. The process for generating the estimate of L2 P code is as follows. As the L2 antenna is collocated with the L1 antenna, the estimate of the L2 P code is initialized using the L1 C/A code. In another approach, if the L2 signal is delayed by an appropriate amount, the L2 P code is same as the L1 P code. The appropriate delay time may be initialized by using an ionosphere model and subsequently using feedback to find the delay resulting in the maximum signal strength of the L2 signal. In yet another approach, a search may be performed for determining the phase of the L2 P code.

In the next step, the estimate of Y code carrier is removed from the L2 second complex signal to generate an L2 baseband signal 206b. The estimate of the L2 Y code carrier is generated as follows. The estimate of the L2 Y code carrier is initialized using the phase of L1 C/A code and the known relationship between the L1 frequency and the L2 frequency. Thereafter, the phase of the L2 Y code carrier may be adjusted to roughly align it with the phase of L2 accumulated signal 114.

Various other methods of L2 P code phase determination and L2 Y code carrier phase determination are discussed in the U.S. patent application Ser. No. 10/300,042 titled "A Method And A System To Improve Performance Of Civilian L1/L2 GPS Receiver Using Multiple Antennas", filed on Nov. 19, 2002 by Integrinautics Corporation, the disclosure of which is hereby incorporated by reference.

Only a coarse adjustment of the carrier phase is necessary for the present invention as opposed to the exact alignment as desired in the conventional methods. Alignment of around 30 degrees from the actual phase is sufficient for the working of the present invention. In the conventional tracking loop techniques, the Y code carrier phase is adjusted to align a replica of the Y code carrier as close as possible to the incoming signal. This is required because of use of the phase of the aligned replica of the Y code carrier to derive the phase of the incoming signal. This is not required in the present invention. Hence, it is not necessary to implement a standard refinement feedback loop to refine the phase of the estimate of Y code carrier. However, the Y code carrier phase may be initialized using a feedback from the L2 carrier phase calculated at the end of the L1/L2 phase and magnitude determination module.

The removal of the P code and the Y code carrier is achieved using a separate multiplier for the L1 signal and the L2 signal. Referring to FIG. 2, a multiplier 204a is used to remove the P code and the L1 Y code carrier from L1 first complex signal 108a. Similarly, a multiplier 204b is used to remove the P code and the L2 Y code from L2 first complex signal 108b. Both the multipliers are complex multipliers.

$$\text{The input to multiplier } 204a = L1\_P(t) \times \exp(-j \times (w_{if} \times t + \Phi_1)) \quad (6a)$$

and similarly, $$\text{the input to multiplier } 204b = L2\_P(t) \times \exp(-j \times (w_{if} \times t + \Phi_2)) \quad (6b)$$

where,

L1_P(t) is the estimate of the L1 P code;

L2_P(t) is the estimate of the L2 P code; and $\Phi_2$ is the estimate of the phase of L2 Y code carrier.

In the next step, L1 baseband signal 206a is accumulated using a first accumulator 208a to generate an L1 second baseband signal 210a. First accumulator 208a accumulates the L1 baseband signal over one P-Code bit. Similarly, L2 baseband signal 206b is accumulated using a second accumulator 208b to generate an L2 second baseband signal 210b.

A full accumulation is performed by both the accumulators. Full accumulation means a complex accumulation of both the inphase as well as the quadrature components of the signal.

The real parts of the second baseband signals are thereafter weighted to generate an L1 weighted signal and an L2 weighted signal. In the preferred embodiment, the real part of L1 second baseband signal 210a is multiplied by a weight factor 212 to generate L1 weighted signal 214a. A fifth multiplier 215, which is a scalar multiplier, is used to perform the above multiplication. The weight factor for the real part of L2 second baseband signal is one. Hence, it is not multiplied with a weight factor. Therefore, L2 weighted signal 214b is equal to the real part of L2 second baseband signal 210b.

The weight factors are generated to take into account the different signal strengths of the L1 Y code carrier and the L2 Y code carrier signals. The ideal weight factor with no transmission and reception errors is sqrt(2). However, because of the variable gain patterns of the antenna, multipath, satellite availability and various other factors, the weight factor may diverge from the ideal value. Weight factors of 1, 1.5 and 2 also give satisfactory results.

In another approach, the weight factor is applied to the L2 baseband ;signal instead of the L1 baseband signal. In this case, the weight factor for the L2 baseband signal is reciprocal of the weight factor applied to the L1 baseband signal.

In another approach, the weight factor is calculated based upon the feedback signal from the calculated relative magnitudes of the L1 Y code carrier and the L2 Y code carrier.

The step of weighting is optional because the optimal weighting of sqrt(2) provides only a minor performance improvement relative to processing without any weighting. In such a case, the baseband signals are directly added to generate a pre-estimate signal.

L1 weighted signal 214a and L2 weighted signal 214b are added using a first adder 216 to generate pre-estimate signal 218. Pre-estimate signal 218 is filtered using a non-causal finite impulse response (FIR) low pass filter (LPF) 220 to generate a first intermediate signal 222. A non-causal filter is one wherein the present output is also dependent on future inputs.

The filter required for the present invention should have the property that the current output is uncorrelated with the current input. For example, a filter of the form $$O(i)=I(i-20)+I(i-19)+\ldots I(i-2)+I(i+2)+\ldots I(i+20) \quad (7)$$

where,

O(i) is the output of the filter at time instant i; and

I(i) is the input of the filter at the time instant i.

As can be seen from equation 7, the output of the filter at time instant i is dependent only on the past and future inputs. Hence, the output at time instant i is not correlated with the input at time instant. The future inputs may be added by delaying the processing.

An Integrate and Dump (I&D) filter may be used instead of a non-causal FIR LPF. In the preferred embodiment, one-W-code-bit I&D filter is used. It is assumed here that the edge timing of the W code is known. Various known techniques available in the art may be used for this.

In the next step, L2 weighted signal 214b is subtracted from first intermediate signal 222 to generate an L2 estimate signal 224b using a second adder 216b. Similarly, L1 weighted signal 214a is subtracted from first intermediate signal 222 to generate an L1 estimate signal 224a using a third adder 216a.

The estimate signals are then passed through a W code estimator to generate the respective W code estimates.

The estimator could be a hard decision estimator, an optimal soft decision estimator, an approximation to an optimal soft decision estimator or a saturated linear approximation to an optimal soft decision estimator.

A hard decision estimator outputs +1 or −1 depending only on the sign of the input. By way of an example, it treats an input of 0.00001 and 2.0 identically, outputting +1 in both the cases.

An optimal soft decision estimator outputs an estimate that effectively provides a relative confidence level in the output. It can be shown that the optimal estimator for this uses a hyperbolic tangent function.

A linear approximation to the optimal soft decision estimator outputs the input as it is.

A saturated linear approximation to an optimal soft decision estimator is a linear approximation to the optimal soft decision estimator that outputs a saturated value of output if the summation of inputs exceeds a saturation level.

If x is input of an estimator and y is output of the estimator, then:

y=sign(x) for a hard decision estimator;

y=tanh(x) for a optimal soft decision estimator;

y=x for a linear approximation to the optimal soft decision estimator; and y=sign(x)*min(abs(x),1) for a saturated linear approximation to the optimal soft decision estimator, where, sign( ) function outputs 1 for a positive input and −1 for a negative input;

tanh( ) is a hyperbolic tangent function;

min( ) outputs the minimum of two inputs; and abs( ) outputs absolute value of the input.

The value of x should be scaled properly for the hyperbolic tangent function. The scaling is a function of the signal to noise ratio and may be performed using an approximate average signal to noise ratio. The scaling may also be performed for individual satellites based on feedback of the signal strength.

In the preferred embodiment, a linear approximation to an optimal soft decision estimator is used. Hence, the L1 W code estimate is equal to L1 estimate signal 224a and the L2 W code estimate is equal to L2 estimate signal 224b.

In the next step, the W code estimates are removed from the corresponding baseband signals. One of the ways of removing the W code estimates is to use a multiplier. A multiplier 226a multiplies L1 estimate signal 224a and L1 second baseband signal 210a to generate an L1 first signal 228a. Similarly, a multiplier 226b multiplies L2 estimate signal 224b and L2 second baseband signal 210b to generate an L2 first signal 228b. Both the third and the fourth multipliers are scalar multipliers.

L2 first signal 228b is thereafter accumulated using a third accumulator 230b to generate an L2 accumulated signal 114. Similarly, L1 first signal 228a is accumulated using a fourth accumulator 230a to generate an L1 accumulated signal 112. L1 accumulated signal 112 is an estimate of the phase and the magnitude of the L1 Y code carrier. Similarly, L2 accumulated signal 114 is an estimate of the phase and the magnitude of the L2 Y code carrier.

Figure 3:
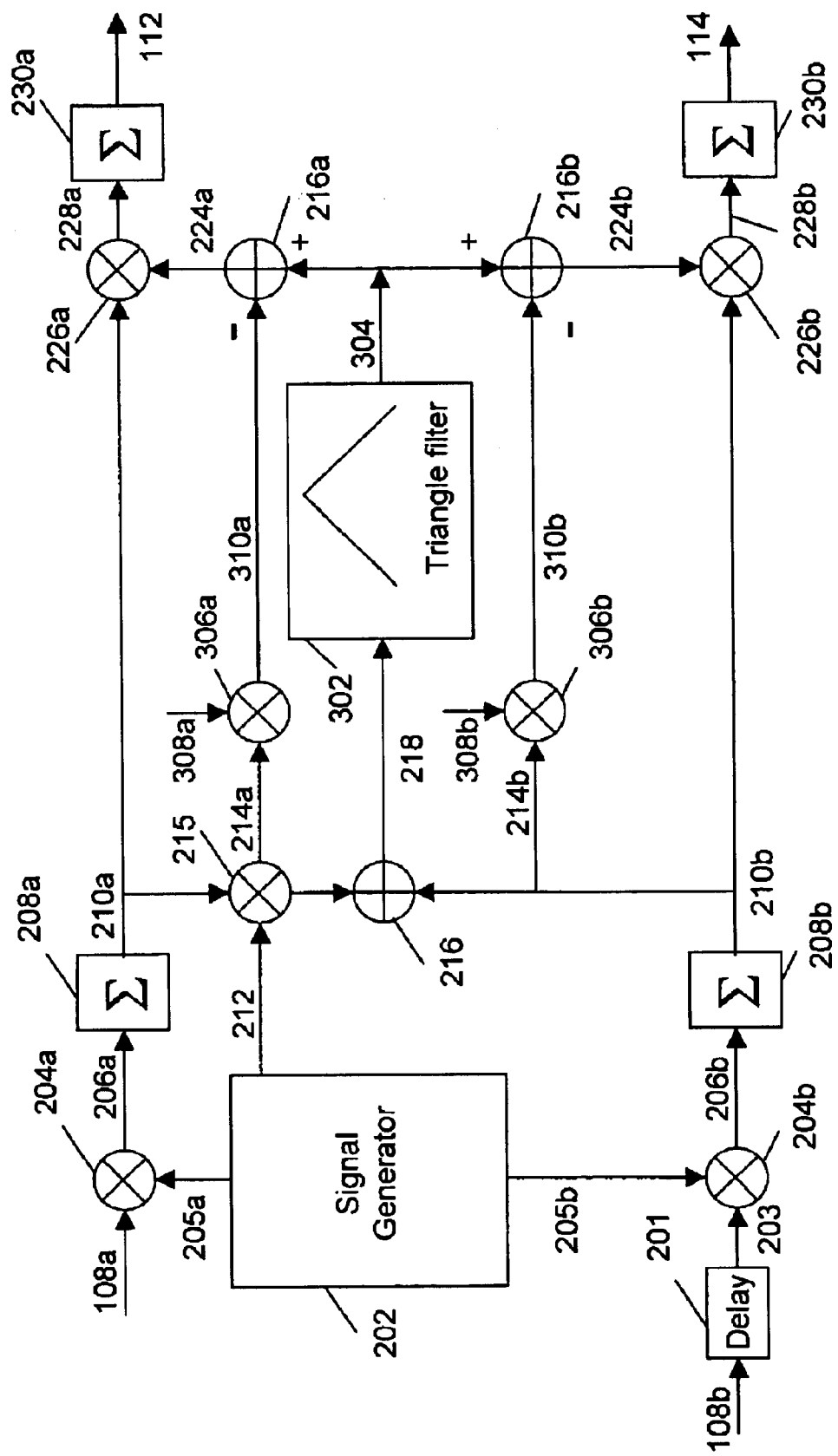
FIG. 3 is an exemplary block diagram illustrating the determination of L1/L2 carrier phases and magnitudes using a triangle filter.

An alternate embodiment shown in FIG. 3 is hereinafter described. This embodiment uses a triangle filter as the non-causal FIR LPF that is applicable in situations wherein the W code edge timing is not known. Most of the initial part of the processing is similar to the preferred embodiment (as discussed with reference to FIG. 2) with the same reference numbers used to designate like components. Pre-estimate signal 218, L1 weighted signal 214a and L2 weighted signal 214b are obtained in exactly the same way as in the preferred embodiment.

Pre-estimate signal 218 is filtered through a triangle filter 302 to generate a first intermediate signal 304.

Triangle filter 302 is approximately 2 W code chips long (i.e. approximately 4 microseconds long). This filter weights samples near the current sample more than the samples that are up to a W code chip away. Samples more than a w-code chip away are not weighted because they are uncorrelated with the current W code chip.

In another approach, the triangle filter may be approximated for easier implementation in digital logic. For example, multiple rectangular filters may be used to approximate a triangle filter.

To compensate for the scaling because of the triangle filter, the weighted signals are multiplied by an appropriate scaling factor. A multiplier 306a multiplies L1 weighted signal 214a with a scaling factor 308a to obtain an L1 second intermediate signal 310a. Similarly, a multiplier 306b multiplies L2 weighted signal 214b with a scaling factor 308b to obtain an L2 second intermediate signal 310b. Both the multipliers are scalar multipliers with a scalar output.

The first intermediate signal, the L1 second intermediate signal and the L2 second intermediate signal are processed in the same way as in the preferred embodiment to obtain the L1 accumulated signal and the L2 accumulated signal.

Figure 4:
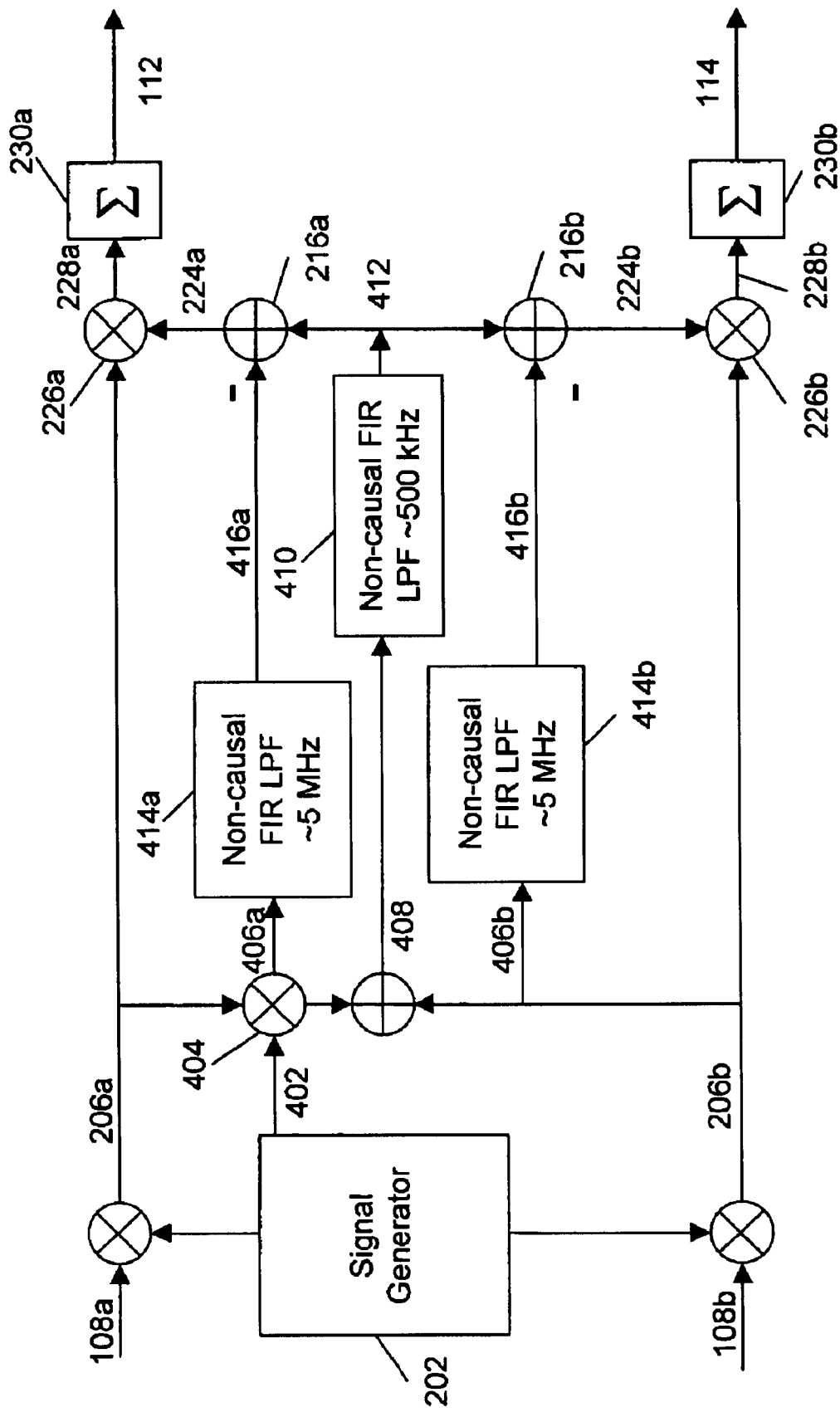
FIG. 4 is an block diagram illustrating the determination of L1/L2 carrier phases and magnitudes with one narrowband and two wide-band non-causal FIR LPF's.

Referring now primarily to FIG. 4, which is another alternate embodiment using a plurality of non-causal FIR LPFs is hereinafter described. The initial processing until obtaining L1 baseband signal 206a and L2 baseband signal 206b is similar to that in the preferred embodiment (as discussed with reference to FIG. 2).

The first step is the weighted addition of the baseband signals to generate weighted signals. This is an optional step. Similar to the preferred embodiment, the weighted addition may be achieved in various ways. In this embodiment, the real part of L1 baseband signal 206a is multiplied with a weight factor 402 using a multiplier 404 to generate an L1 weighted signal 406a. Multiplier 404 is a scalar multiplier with a complex output. The weight factor is generated by signal generator 202 using any of the techniques as described with reference to the preferred embodiment. The weight factor for the real part of L2 baseband signal is unity. Hence, an L2 weighted signal 406b is equal to the real part of L2 baseband signal 206b. The step of weighting is optional and may be omitted.

L1 weighted signal 406a thus obtained is added to L2 baseband signal 406b to obtain a pre-estimate signal 408. Pre-estimate signal 408 is filtered through a narrow-band non-causal FIR LPF 410. Non-causal FIR LPF 410 is similar to the filters used in the preferred embodiment (as explained with reference to FIG. 2). The output of FIR LPF 410 is a first intermediate signal 412. The first intermediate signal represents an estimate that is correlated with the errors in L1 and L2 signals.

L1 weighted signal 406a is filtered through a wide-band non-causal FIR LPF 414a to generate an L1 second intermediate signal 416a. Similarly, L2 baseband signal 406b is filtered through a wide-band non-causal FIR LPF 414b to generate an L2second intermediate signal 416b. The bandwidth of the narrow-band non-causal filter is related to the W code chipping rate, while the bandwidth of the narrow-band non-causal filter is related to the P code chipping rate. In this embodiment, wide-band non-causal FIR LPF 414a and 414b are 5 MHz wide and narrow-band non-causal FIR LPF 410 is 500 KHz wide.

The L1 second intermediate signal represents the estimate that is correlated with the errors in the L1 signal. Similarly, the L2 second intermediate signal represents the estimate that is correlated with the errors in the L2 signal. Hence, estimates that are uncorrelated with the errors in the inphase and the quadrature components of the L1 signal and the L2 signal, are obtained by subtracting the corresponding correlated estimates from first intermediate signal 412.

The filters should be designed such that when the output of the wider filter is subtracted from the output of the narrower filter, the resulting signal is uncorrelated with the instantaneous input to the filters. This is accomplished by making the filter coefficients around $z^0$ identical. The number of samples around $z^0$ that should be identical is a function of the spectral content of the noise, which is of the order of 10 MHz. The number of coefficients may be upper-bounded by the number of samples in two P code chips.

The first intermediate signal, the L1 second intermediate signal and the L2 second intermediate signal are processed in the same way as in the preferred embodiment to obtain the L1 accumulated signal and the L2 accumulated signal.

In another approach, the weight factor is applied to the L2 baseband signal instead of the L1 baseband signals.

In yet another approach, FIR LPF 410 is replaced by two equivalent 500 KHz FIR LPFs in parallel. L1 weighted signal 416a and L2 weighted signal 416b are not added in this approach. Instead, they are processed separately using the pair of FIR LPFs. Further processing is similar to the present embodiment.

In yet another approach, a boxcar filter that is approximately 1 W code chip long (i.e. approximately 2 microseconds long) is used as FIR LPF 410 and 200 nanosecond boxcar filters are used as FIR LPFs 414a and 414b. A boxcar filter outputs a summation of inputs over a range of samples. For example, the last 20 samples, the current sample and the next 20 samples might be added to generate the output.

Figure 5:
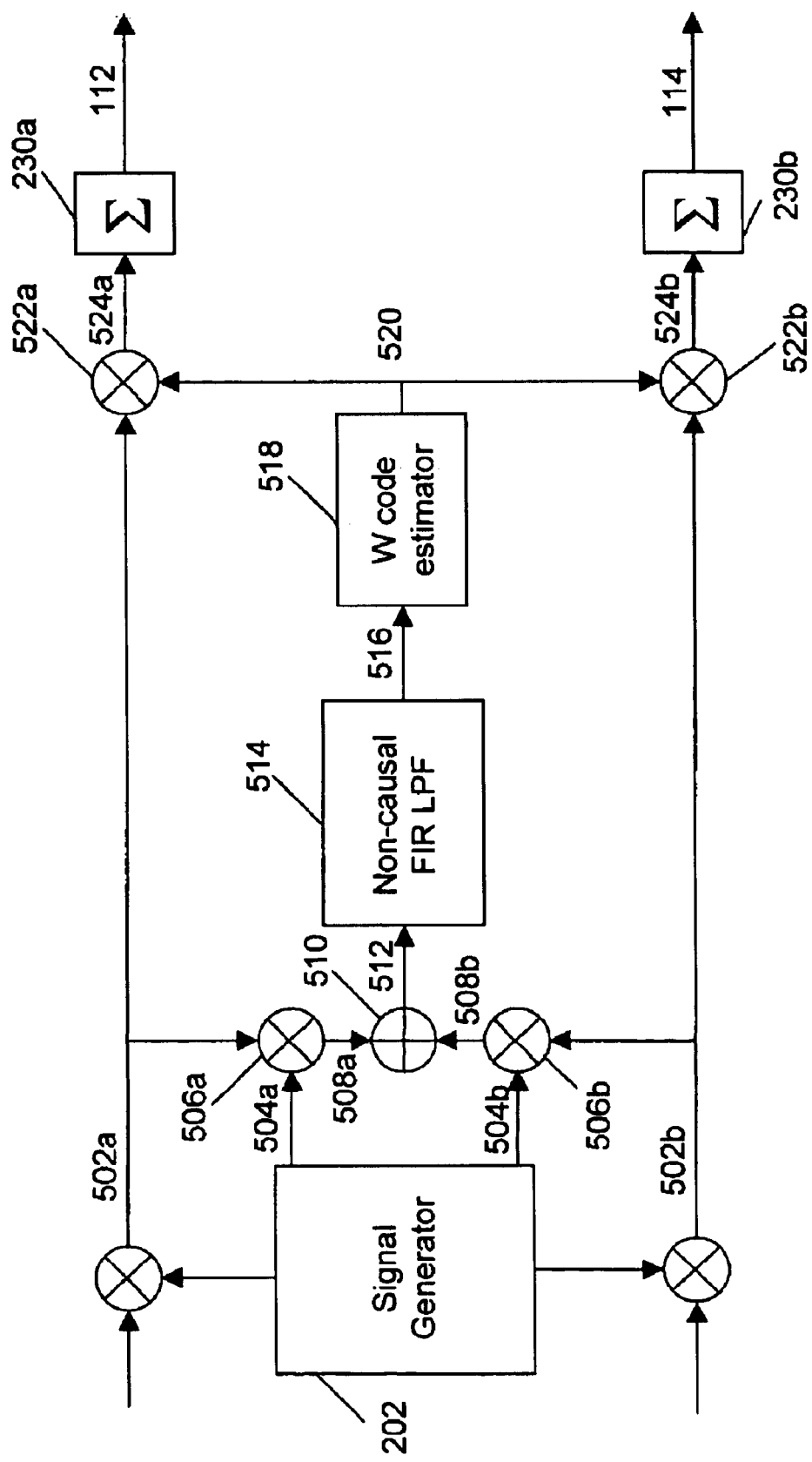
FIG. 5 is an exemplary block diagram of an alternative embodiment illustrating the determination of L1/L2 carrier phases and magnitudes using a non-causal FIR LPF.

Referring now primarily to FIG. 5, an alternate embodiment is hereinafter described. In this embodiment, the first complex signals are converted to the primary signals. The procedure is similar to the method of generating baseband signals in the preferred embodiment (as explained with reference to FIG. 2). However, no estimate of the actual signal phase is removed from the L1 signal and the L2 signal. Hence, the L1 primary signal and the L2 primary signal have completely arbitrary phases. Only the P code and the Y code carrier signals are removed from the L1 signal and the L2 signal to obtain the corresponding primary signals. Thus, an L1 primary signal 502a and an L2 primary signal 502b is generated from the L1 first complex signal and the L2 first complex signal.

In the next step, the primary signals are projected onto a common phasor to generate baseband signals. The common phasor is an estimated inphase direction of the input signals. This is achieved by multiplying the primary signals with the primary signal estimate generated by signal generator 202.

The estimate of the primary signal may be represented as:

$$\text{Estimate of the primary signal} = B \times W(t) \times \exp(j \times (\phi + \delta\phi)) \quad (8)$$

where,

B is the weight factor; and

δφ is the error in the estimation of the phase φ of Y code carrier signal.

Equation 8 represents estimates for both the L1 and the L2 primary signals. The phase angle φ will be different for the L1 signal and the L2 signal. The dot product of the primary signal and the estimate of primary signal is a projected signal. The projected signal is a scalar quantity representing the W code.

$$\text{Projected signal} = \text{primary signal} \times \text{estimate of the primary signal} = A_o \times W(t) \times B \times \cos(\delta\phi) + \text{noise} \quad (9)$$

where, noise represents the residual noise in the signal, which is a function of N1 and N2.

Equation 9 represents the projected signals for both the L1 signal and the L2 signal. In the above expression, if $\cos(\delta\phi)$ is nearly equal to unity, the above expression contains most of the signal power that may be used to estimate the W code.

L1 primary signal 502a is multiplied by an L1 primary estimate signal, 504a using a multiplier 506a. The output of multiplier 506a is a projected signal 508a. Similarly, L2 primary signal 502b is multiplied by an L2 primary estimate signal 504b using a multiplier 506b. The output of multiplier 506b is a projected signal 508b. Multiplier 506a and multiplier 506b are dot multipliers. Hence, both the projected signals are scalar quantities. The projected signals are added using an adder 510 to generate a pre-estimate signal 512. Pre-estimate signal 512 is fed to a non-causal FIR LPF 514 to generate an uncorrelated pre-estimate signal 516. Pre-estimate signal 516 is not correlated with the error in the inphase and quadrature components of both the L1 signal and the L2 signal. The FIR LPF is similar to the filters used in the preferred embodiment (as described in reference with FIG. 2). An example of a filter with the above properties is a combination of two boxcar filters with one ending at the previous sample and the other starting at the next sample. Both the boxcar filters are approximately half W code chip long (i.e. approximately 1 microsecond long).

The projected signals are thereafter filtered to generate an output signal that is uncorrelated with the errors in the inphase and the quadrature components of the L1 signal as well as the L2 signal. This is possible because the P code is removed from the baseband signal and also because the original noise is nearly white on the sampling interval. Hence, the noise with the P code removed is not correlated over periods greater than a P code chip.

The output of the W code estimator is an estimate of W code 520 that is uncorrelated with the error in the inphase as well as quadrature components of the L1 signal and the L2 signal. This W code estimate is then removed from L1 primary signal 502a and L2 primary signal 502b. A multiplier 522a multiplies estimate of W code 520 with L1 primary signal 502a to generate an L1 first signal 524a. Similarly, a multiplier 522b multiplies estimate of W code 520 with L2 primary signal 502b to generate an L2 first signal 524b. Both the multipliers are scalar multipliers with one complex input.

The rest of the processing of L1 first signal 524a and L2 first signal 524b is similar to that in the preferred embodiment (discussed in reference with FIG. 2).

It should be noted that in all the abovementioned embodiments, complete processing of the L1 signals is not required if the L2 phase and the magnitude are the only quantities of interest. Though L1 signals are required for W code estimation, it is not essential to generate a W code estimate that is uncorrelated with the error in the inphase and the quadrature components of the L1 signal. Hence, if the L1 Y code carrier phase is not of interest, the L1 first intermediate signal, L1 estimate signal, L1 first signal and the L1 accumulated signal may not be calculated. The implementation of the method may be made simpler if L1 Y code carrier phase is not required.

All the embodiments are implemented partly on a processor and partly on a correlator. The correlator is constructed from digital logic elements such as Application Specific Integrated Circuits (ASICs), Field Programmable Gate Arrays (FPGAs) and buffers. Generation of estimate of the P code is also done by the correlator. The correlator also implements a numerically controlled oscillator that generates an estimate of the Y code carrier. All the multipliers are also implemented in the correlator. All the filters are also embodied in the correlator.

Advantages of the Present Invention

The present invention provides W code estimates that are uncorrelated with the errors in the inphase and the quadrature components of the L1 signal and the L2 signal. This allows for removal of the W code from the inphase component of both the L1 signal and the L2 signal with zero mean errors. The present invention also provides estimates of relative magnitudes of the L1 signal and the L2 signal, which may be used to estimate the statistics of the phase errors due to noise. The strength of the signals may be maximized later to align the code phase replicas with the incoming signals. The multipath environment may also be studied by looking for alternating periods of constructive/destructive interference. The present invention also obviates the need to generate an exact replica of the Y code carrier before removing it from the L1 and the L2 signals. The present invention also has many implementation advantages because of the simplicity of design.

While certain embodiments of the present invention have been illustrated and described, additional variations and modifications in these embodiments may occur to those skilled in the art once they learn of the basic inventive concepts. Values for various parameters mentioned in the description of the preferred embodiment are merely illustrative in nature. Therefore, it is intended that the appended claims shall be construed to include both the preferred embodiment, and all such variations and modifications as fall within the spirit and scope of the invention as described in the claims.

What is claimed is:

1. A method of estimating phase and magnitude of an L2 GPS signal, the L2 signal having a P code, and a W code modulated onto it, the W code being an unknown code, the method comprising the steps of:
   a. generating an L1 baseband signal using the L1 signal;
   b. generating an L2 baseband signal using the L2 signal;
   c. accumulating the L1 baseband signal over one P code bit to generate an L1 second baseband signal;
   d. accumulating the L2 baseband signal over one P code bit to generate an L2second baseband signal;
   e. generating the L2 W code estimate using the L1 second baseband signal and the L2 second baseband signal, the W code estimate at a time instant being uncorrelated with the error in the inphase and the quadrature components of the L2 signal at that time instant;
   f. removing the L2 W code estimate from the L2 second baseband signal to generate an L2 first signal; and
   g. accumulating the L2 first signal to generate an L2 accumulated signal, the L2accumulated signal being a measure of the phase and the magnitude of the L2 Y code carrier signal.

2. The method according to claim 1 wherein the step of generating an L1 baseband signal comprises the sub-steps of:
   a. filtering, down-converting and sampling the L1 signal to generate an L1 first complex signal;
   b. generating an estimate of L1 P code and an estimate of L1 carrier signal;
   c. removing the estimate of L1 P code and the estimate of L1 carrier signal from the L1 first complex signal to generate an L1 baseband signal.

3. The method according to claim 1 wherein the step of generating the L2 W code estimate comprises the sub-steps of:
   a. adding the L1 second baseband signal and the L2 second baseband signal to generate a pre-estimate signal;
   b. filtering the pre-estimate signal using a non-causal FIR LPF to generate a first intermediate signal, the first intermediate signal being correlated with the error in the L1 signal and the error in the L2 signal;
   c. subtracting the L2 second baseband signal from the first intermediate signal to generate an L2 estimate signal, the L2 estimate signal being uncorrelated with the errors in the L2 signal; and
   d. estimating the L2 W code using the L2 estimate signal.

4. A system for estimating phase and magnitude of an L2 GPS signal, the L2 signal having a P code and a W code modulated onto it, the W code being an unknown code, the system comprising:
   a. means for generating an L1 baseband signal using the L1 signal;
   b. means for generating an L2 baseband signal using the L2 signal;
   c. a first accumulator accumulating the L1 baseband signal over one P code bit to generate an L1 second baseband signal;
   d. a second accumulator accumulating the L2 baseband signal over one P code bit to generate an L2 second baseband signal;
   e. a W code generator, the W code generator generating an L2 W code estimate using the L1 second baseband signal and the L2 second baseband signal, the W code estimate at a time instant being uncorrelated with the error in the inphase and the quadrature components of the L2 signal at that time instant;
   f. a multiplier removing the L2 W code estimate from the L2 second baseband signal to generate an L2 first signal; and
   g. a third accumulator accumulating the L2 first signal to generate an L2 accumulated signal which is a measure of the phase and the magnitude of the L2 Y code carrier signal.

5. The system according to claim 4 wherein the means for generating an L1 baseband signal comprises:
   a. an L1 RF section filtering, down-converting and sampling the L1 signal to generate an L1 first complex signal; and
   b. a signal generator generating an estimate of L1 P code and an estimate of L1 carrier signal; and
   c. a first multiplier removing the estimate of L1 P code and the estimate of L1 carrier signal from the L1 first complex signal to generate an L1 baseband signal.

6. The system according to claim 4 wherein the W code generator comprises:
   a. a first adder adding the L1 second baseband signal and the L2 second baseband signal to generate a pre-estimate signal;
   b. a non-causal FIR LPF filtering the pre-estimate signal to generate an intermediate signal, the non-causal FIR LPF being such that when the L2 second baseband signal is subtracted from the output of the non-causal FIR LPF, the resulting signal is uncorrelated with the instantaneous input to the filter;
   c. a second adder subtracting the L2 second baseband signal from the first intermediate signal to generate an L2 estimate signal; and
   d. a W code estimator estimating the L2 W code using the L2 estimate signal.

7. A method of estimating the W code for an L2 GPS signal, the L2 signal having a P code and a W code modulated onto it, the W code being an unknown code, the method comprising the steps of:
   a. generating an L1 baseband signal using the L1 signal;
   b. generating an L2 baseband signal using the L2 signal; and
   c. generating the W code estimate using the L1 baseband signal and the L2 baseband signal, the W code estimate at a time instant being uncorrelated with the error in the inphase and the quadrature components of the L2 signal at that time instant.

8. The method according to claim 7 wherein the step of generating the W code estimate comprises the sub-steps of:
   a. adding the L1 baseband signal and the L2 baseband signal to generate a pre-estimate signal;
   b. filtering the pre-estimate signal using a narrow-band non-causal FIR LPF to generate a first intermediate signal, the first intermediate signal being correlated with the error in the L1 signal and the error in the L2 signal;
   c. filtering the L2 baseband signal using a wide-band non-causal FIR LPF to generate an L2 second intermediate signal, the L2 second intermediate signal being correlated with the errors in the L2 signal;
   d. subtracting the L2 second intermediate signal from the first intermediate signal to generate an L2 estimate signal, the L2 estimate signal being uncorrelated with the errors in the L2 signal; and
   e. estimating the W code using the L2 estimate signal.

9. A system for estimating the W code for an L2 GPS signal, the L2 signal having a P code and a W code modulated onto it, the W code being an unknown code, the system comprising:
   a. means for generating an L1 baseband signal using the L1 signal;
   b. means for generating an L2 baseband signal using the L2 signal; and
   c. a W code generator generating the W code estimate using the L1 baseband signal and the L2 baseband signal, the W code estimate at a time instant being uncorrelated with the error in the inphase and the quadrature components of the L2 signal at that time instant.

10. The system according to claim 9 wherein the W code generator comprises:
    a. a first adder adding the L1 baseband signal and the L2 baseband signal to generate a pre-estimate signal;

b. a narrow-band non-causal FIR LPF filtering the pre-estimate signal to generate a first intermediate signal;

c. a wide-band non-causal FIR LPF filtering the L2 baseband signal to generate an L2 second intermediate signal, the wide-band non-causal FIR LPF being such that when the output of the wide-band non-causal FIR LPF is subtracted from the output of the narrow-band non-causal FIR LPF, the resulting signal is uncorrelated with the instantaneous input to the filters;

d. a second adder subtracting the L2 second intermediate signal from the first intermediate signal to generate an L2 estimate signal; and e. a W code estimator estimating the L2 W code using the L2 estimate signal.

11. A method of estimating the W code for L1 GPS signals and L2 GPS signals, the signals having a P code and a W code modulated onto it, the W code being an unknown code, the method comprising the steps of:

a. generating an L1 primary signal using the L1 signal;

b. generating an L2 primary signal using the L2 signal; and c. generatng the W code estimate using the L1 primary signal and the L2 primary signal, the W code estimate at a time instant being uncorrelated with the errors in the inphase and the quadrature components of the L1 signal and the L2 signal at that time instant.

12. The method according to claim 11 wherein the step of generating the W code estimate comprises the sub-steps of:

a. projecting the L1 primary signal onto a common phasor to generate an L1 projected signal, the common phasor being an estimated inphase direction of the L1 signal;

b. projecting the L2 primary signal onto the common phasor to generate an L2 projected signal, the common phasor being an estimated inphase direction of the L2 signal;

c. adding the L1 projected signal and the L2 projected signal to generate a pre-estimate signal;

d. filtering the pre-estimate signal using a non-causal FIR LPF to generate an estimate signal, the estimate signal being uncorrelated with the error in the inphase and the quadrature components of the L1 signal and the L2 signal; and e. estimating the W code using the estimate signal.

13. A system for estimating the W code for L1 GPS signals and L2 GPS signals, the signals having a P code and a W code modulated onto it, the W code being an unknown code, the system comprising:

a. means for generating an L1 primary signal using the L1 signal;

b. means for generating an L2 primary signal using the L2 signal;

c. a W code generator generating the W code estimate using the L1 primary signal and the L2 primary signal, the W code estimate at a time instant being uncorrelated with the errors in the inphase and the quadrature components of the L1 signal and the L2 signal at that time instant.

14. The system according to claim 13 wherein the W code generator comprises:

a. means for projecting the L1 primary signal onto a common phasor to generate an L1 projected signal;

b. means for projecting the L2 primary signal onto a common phasor to generate an L2 projected signal;

c. a first adder adding the L1 projected signal and the L2 projected signal to generate a pre-estimate signal;

d. a non-causal FIR LPF filtering the pre-estimate signal to generate an estimate signal, the non-causal FIR LPF being such that the output at a time instant is uncorrelated with the input at that time instant; and e. a W code estimator estimating the W code using the estimate signal, the W code estimate being the same for both the L1 signal and the L2 signal.

15. A method of estimating phase and magnitude of L1 and L2 signals, the signals having a P code and a W code modulated onto it, the W code being an unknown code, the method comprising the steps of:

a. generating an L1 baseband signal using the L1 signal;

b. generating an L2 baseband signal using the L2 signal;

c. generating an L1 W code estimate and an L2 W code estimate using the L1 baseband signal and the L2 baseband signal, the L1 W code estimate at a time instant being uncorrelated with the error in the inphase and the quadrature components of the L1 signal at that instant, the L2 W code estimate at a time instant being uncorrelated with the error in the inphase and the quadrature components of the L2 signal at that instant;

d. removing the L1 W code estimate from the L1 baseband signal to generate an L1 first signal;

e. removing the L2 W code estimate from the L2 baseband signal to generate an L2 first signal;

f. accumulating the L1 first signal to generate an L1 accumulated signal, the L1 accumulated signal being a measure of the phase and the magnitude of the L1 Y code carrier signal; and g. accumulating the L2 first signal to generate an L2 accumulated signal, the L2 accumulated signal being a measure of the phase and the magnitude of the L2 Y code carrier signal.

16. The method according to claim 15 wherein the estimate of carrier signal for the L2 signal is generated using the feedback from the L2 accumulated signal.

17. The method according to claim 15 wherein the step of generating the L1 W code estimate and the L2 W code estimate comprises the sub-steps of:

a. adding the L1 baseband signal and the L2 baseband signal to generate a pre-estimate signal;

b. filtering the pre-estimate signal using a narrow-band non causal FIR LPF to generate a first intermediate signal, the first intermediate signal being correlated with the errors in the L1 signal and the L2 signal;

c. filtering the L1 baseband signal using a wide-band non-causal FIR LPF to generate an L1 second intermediate signal, the L1 second intermediate signal being correlated with the error in the L1 signal;

d. filtering the L2 baseband signal using a wide-band non-causal FIR LPF to generate an L2 second intermediate signal, the L2 second intermediate signal being correlated with the error in the L2 signal;

e. subtracting the L1 second intermediate signal from the first intermediate signal to generate an L1 estimate signal, the L1 estimate signal being uncorrelated with the error in the L1 signal;

f. subtracting the L2 second intermediate signal from the first intermediate signal to generate an L2 estimate signal, the L2 estimate signal being uncorrelated with the error in the L2 signal;

g. estimating the L1 W code using the L1 estimate signal; and h. estimating the L2 W code using the L2 estimate signal.

18. A system for estimating phase and magnitude of L1 and L2 signals, the signals having a P code and a W code modulated onto it, the W code being an unknown code, the system comprising:

a. means for generating an L1 baseband signal using the L1 signal;

b. means for generating an L2 baseband signal using the L2 signal;

c. a W code generator, the W code generator generating an L1 W code estimate and an L2 W code estimate using the L1 baseband signal and the L2 baseband signal, the L1 W code estimate at a time instant being uncorrelated with the error in the inphase and the quadrature components of the L1 signal at that time instant, the L2 W code estimate at a time instant being uncorrelated with the error in the inphase and the quadrature components of the L2 signal at that time. instant;

d. a first multiplier removing the L1 W code estimate from the L1 baseband signal to generate an L1 first signal;

e. a second multiplier removing the L2 W code estimate from the L2 baseband signal to generate an L2 first signal;

f. a first accumulator accumulating the L1 first signal to generate an L1 accumulated signal, the L1 accumulated signal being a measure of the phase and the magnitude of the L1 Y code carrier signal; and g. a second accumulator accumulating the L2 first signal to generate an L2 accumulated signal, the L2 accumulated signal being a measure of the phase and the magnitude of the L2 Y code carrier signal.

19. The system according to claim 18 wherein the W code generator comprises:

a. a first adder adding the L1 baseband signal and the L2 baseband signal to generate a pre-estimate signal;

b. a narrow-band non-causal FIR LPF filtering the pre-estimate signal to generate a first intermediate signal;

c. a first wide-band non-causal FIR LPF filtering the L1 baseband signal to generate an L1 second intermediate signal, the first wide-band non-causal FIR LPF being such that when the output of the first wide-band non-causal FIR LPF is subtracted from the output of the narrow-band non-causal FIR LPF, the resulting signal is uncorrelated with the instantaneous input to the filters;

d. a second wide-band non-causal FIR LPF filtering the L2 baseband signal to generate an L2 second intermediate signal, the second wide-band non-causal FIR LPF being such that when the output of the second wide-band non-causal FIR LPF is subtracted from the output of the narrow-band non-causal FIR LPF, the resulting signal is uncorrelated with the instantaneous input to the filters;

e. a second adder subtracting the L1 second intermediate signal from the first intermediate signal to generate an L1 estimate signal;

f. a third adder subtracting the L2 second intermediate signal from the first intermediate signal to generate an L2 estimate signal;

g. a first W code estimator estimating the L1 W code estimate using the L1 estimate signal; and h. a second W code estimator estimating the L2 W code estimate using the L2 estimate signal.

20. The system according to claim 19 wherein the W code estimator is selected from a group consisting of: hard decision estimator, soft decision estimator, optimal soft decision estimator, a linear approximation to an optimal soft decision estimator and a saturated linear approximation to an optimal soft decision estimator.

21. The system according to claim 19 wherein the bandwidth of the narrow-band non-causal FIR LPF is related to the W code chipping rate and the bandwidth of the wide-band non-causal FIR LPF is related to the P code chipping rate.

22. The system according to claim 19 wherein the FIR LPFs are selected from a group consisting of: a triangle filter, a boxcar filter.

* * * * *